(12) United States Patent
Han et al.

(10) Patent No.: US 11,779,035 B2
(45) Date of Patent: Oct. 10, 2023

(54) LOW-CALORIC BEVERAGE

(71) Applicant: SAMYANG CORPORATION, Seoul (KR)

(72) Inventors: Tae-Chul Han, Hwaseong-si (KR); Bong Chan Kim, Seoul (KR); Yong-In Kim, Yongin-si (KR); Il Seo, Gwangju-si (KR); Seung Mi Lee, Hwaseong-si (KR); Su Youn Lim, Seoul (KR); Hye Jin Lim, Suwon-si (KR)

(73) Assignee: SAMYANG CORPORATION, Seoul (KR)

( * ) Notice: Subject to any disclaimer, the term of this patent is extended or adjusted under 35 U.S.C. 154(b) by 408 days.

(21) Appl. No.: 16/770,684

(22) PCT Filed: Nov. 27, 2018

(86) PCT No.: PCT/KR2018/014721
§ 371 (c)(1),
(2) Date: Jun. 8, 2020

(87) PCT Pub. No.: WO2019/117506
PCT Pub. Date: Jun. 20, 2019

(65) Prior Publication Data
US 2021/0161178 A1    Jun. 3, 2021

(30) Foreign Application Priority Data

Dec. 12, 2017  (KR) .................. 10-2017-0170519
Dec. 12, 2017  (KR) .................. 10-2017-0170788

(51) Int. Cl.
| | | |
|---|---|---|
| *A23L 2/60* | (2006.01) | |
| *A23L 29/269* | (2016.01) | |
| *A23L 33/20* | (2016.01) | |
| *A23L 33/135* | (2016.01) | |
| *A23L 2/02* | (2006.01) | |
| *A23L 2/38* | (2021.01) | |
| *A23L 2/68* | (2006.01) | |

(52) U.S. Cl.
CPC .................. *A23L 2/60* (2013.01); *A23L 2/02* (2013.01); *A23L 2/38* (2013.01); *A23L 2/68* (2013.01); *A23L 29/269* (2016.08); *A23L 33/135* (2016.08); *A23L 33/20* (2016.08)

(58) Field of Classification Search
None
See application file for complete search history.

(56) References Cited

U.S. PATENT DOCUMENTS

| | | |
|---|---|---|
| 2010/0239684 A1 | 9/2010 | Fukui |
| 2014/0342044 A1 | 11/2014 | Bell et al. |
| 2016/0198750 A1* | 7/2016 | Carlson .................. A23L 27/36 |
| | | 426/658 |
| 2016/0302463 A1 | 10/2016 | Woodyer et al. |

FOREIGN PATENT DOCUMENTS

| | | | |
|---|---|---|---|
| JP | 2004-173678 | 6/2004 | |
| JP | 2009-517032 | 4/2009 | |
| JP | 2014-014276 | 1/2014 | |
| JP | 2016-521974 | 7/2016 | |
| KR | 10-2004-0024491 | 3/2004 | |
| KR | 10-2010-0084622 | 7/2010 | |
| KR | 10-2012-0033282 | 4/2012 | |
| KR | 10-2015-0127155 | 11/2015 | |
| KR | 10-2015-0130323 | 11/2015 | |
| KR | 10-2016-0051084 | 5/2016 | |
| KR | 10-2016-0089551 | 7/2016 | |
| KR | 10-2016-0143444 | 12/2016 | |
| WO | WO-2012009273 A1 * | 1/2012 | ............ A23L 2/52 |
| WO | 2016-152818 | 9/2016 | |
| WO | 2017-029245 | 2/2017 | |
| WO | 2017-059414 | 4/2017 | |
| WO | 2017-081667 | 5/2017 | |
| WO | 2017-189994 | 11/2017 | |

OTHER PUBLICATIONS

Machine translation of JP2004173678, publication date Jun. 24, 2004. pp. 1-8. (Year: 2004).*
JPO, Office Action of JP 2020-531950 dated Aug. 3, 2021.
EPO, Extended Search Report of EP 18889681.5 dated Sep. 9, 2021.
KIPO, PCT Search Report & Written Opinion of PCT/KR2018/014721 dated Apr. 16, 2019.

* cited by examiner

*Primary Examiner* — Jenna A Watts
(74) *Attorney, Agent, or Firm* — LEX IP MEISTER, PLLC

(57) ABSTRACT

The present invention relates to a low-calorie beverage having excellent sensory properties and sweetness, and more particularly, to a beverage containing allulose as a sweetener.

14 Claims, 2 Drawing Sheets

[FIG. 1]
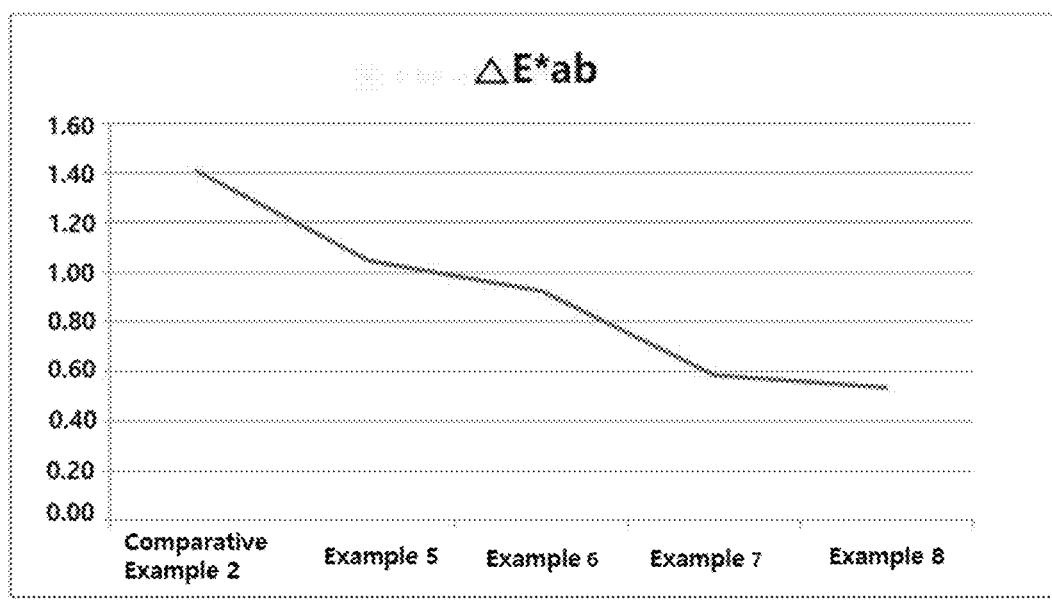

[FIG. 2]
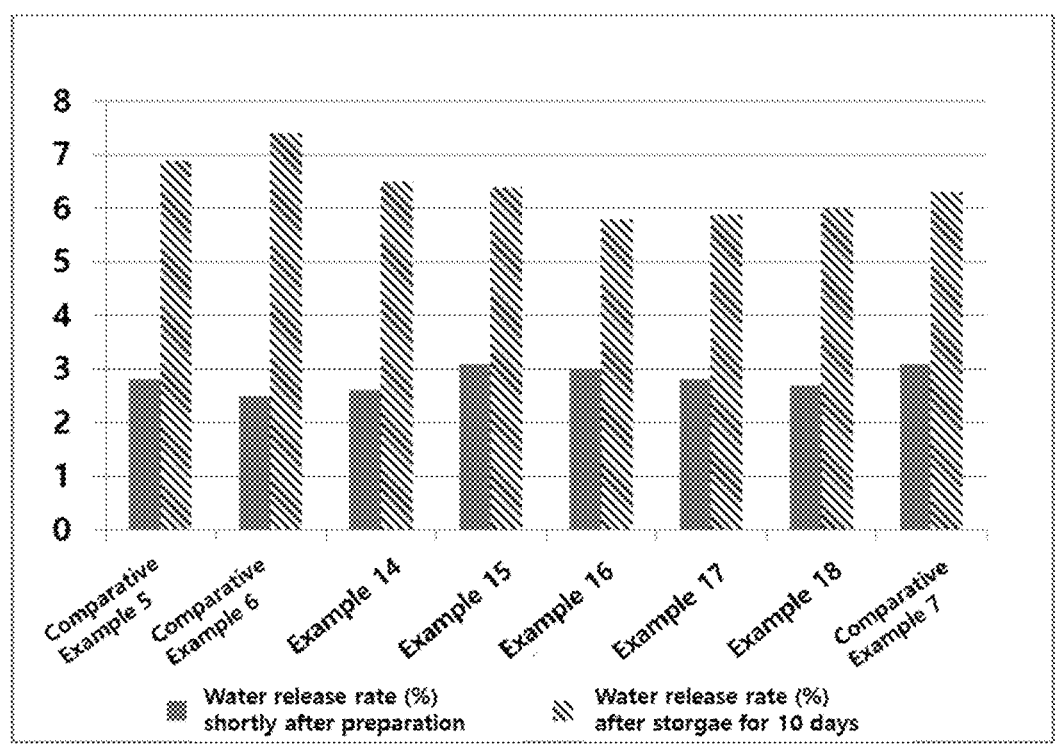

LOW-CALORIC BEVERAGE

TECHNICAL FIELD

The present invention relates to a low-calorie beverage having excellent sensory properties and sweetness quality, and more particularly, to a beverage containing allulose as a sweetener.

RELATED ART

As the pubic dietary life has been westernized in various beverages, consumption of indulgence foods and beverages has increased significantly, and various beverage products have been consumed compared to the past. The commercial beverages contain large amounts of sugar or fructose.

Sugar is one of the typical sweeteners that have sucrose as the main ingredient and are added to food to show the sweet taste. Since sugar has excellent sweetness degree, it has been added to various foods, processed foods, etc. from the past, and has been regarded as the most preferred sweetener to enhance the taste and enhance the appetite of food.

Recently, however, the problem has been raised as the harmfulness of sugar continues to be revealed. Specifically, the excessive consumption of sugar has been pointed out as a major cause of various lifestyle-related diseases such as obesity and diabetes, as well as tooth decay, and thus the need of developing an alternative sweetener that can substitute for sugar is emerging worldwide. The government has also made policy to encourage the practice of 'saccharides reduction' in food and beverage compositions. The term, 'saccharide' according to the device analysis method of the Food Sanitation Act refers to all of monosaccharides and disaccharides present in food, where the monosaccharides include fructose and glucose and disaccharides include sucrose, maltose, and lactose. In order to achieve the saccharides reduction as described above in food and beverage, the substitution of sugar is inevitable.

Accordingly, a calorie-free or low-calorie sweetener has been developed as an alternative sweetener for sugar. Among them, polyols or sugar alcohols having low calories such as erythritol, xylitol, sorbitol, and maltitol are used as an alternative sweetener for sugar sweeteners to replace sugar, and typical examples include sorbitol and erythritol. These sweeteners can provide reduced calorie, but are difficult to completely replace sugar in sweetness degree and sweetness quality, and are often not suitable for use at a high amount due to the low gastrointestinal resistance.

Allulose used as a sweetener to replace the sugar is an epimer of fructose at third carbon has a sweetness degree equivalent to 70% of fructose, and is a functional sugar that inhibits blood sugar control, cavity prevention, and inhibition of fat synthesis in the liver. The sugar alcohols, which are frequently used as alternative sweetener for sugar, have side effects such as causing diarrhea when consumed over a certain amount. However, allulose has not been known to have any side effect. Therefore, an interest for allulose as a sweetener is growing.

Recently, water beverages are marketed under the names of a tasted drink, a flavored drink, near water, and non-juice drink, etc. and they are differentiated from other drinks, because they improve the bland taste of bottled pure water and the roughness of conventional juice drinks and do not get tired due to the no strong taste. However, in the conventional near water beverage represented by such a non-juice beverage, the saccharides such as glucose, fructose, and sugar are added to provide a sweet taste of the fruit in addition to the fruit juice. The drinking the sugary beverages like water can have adverse effect on health. In particular, unlike other soft drinks, the near-water drink is considered as a drink product to be consumed instead of water, so the probability of excessive consumption is much higher.

In addition, gel-phase beverages are mainly produced by preparing the gel-phase beverage using a gelling agent for gel formation and encapsulating. Carrageenan which is a gelling agent used mainly, is obtained by extracting red algae with hot water or a hot alkaline aqueous solution and then purifying it. It is characterized by excellent water retention and no viscosity change over time, but it exhibits a decrease in viscosity due to a temperature increase and agitation. In particular, as the viscosity of the product increases due to the temperature increase in the summer, there is a concern that the complaint for product may be raised. If the formed network breaks due to weakened viscosity of carrageenan, the formed gel may be broken. For the reason, in the case of a carbonated drink that is eaten by shaking, there is a problem in that carbon dioxide gases blow out at the moment when the can is open with shaking. Agar as a gelling agent has problems such as poor taste due to insufficient restorability in cold water or hot water.

DETAILED DESCRIPTION

Technical Problem

An embodiment of the present invention provides a low-calorie beverage having excellent sensory properties and sweetness quality, and specifically, a beverage containing allulose as a sweetener, for example, a water beverage or a gel-phase beverage.

A further embodiment of the present invention provides a water beverage having added flavor and/or taste with low calorie and solid content and a method for preparing the same.

Another embodiment of the present invention provides a water beverage having excellent sensory properties and functionality and a method for preparing the same.

A further embodiment of the present invention provides a gel-phase beverage having excellent sweetness degree and sweetness quality and achieving low calorie by reducing the saccharides, and a method for preparing the same.

A further embodiment of the present invention provides a gel-phase beverage having low water release rate and maintaining the gel-phase stably during storage after preparing the beverage, and a method of preparing the same.

Technical Solution

The present invention relates to a low-calorie beverage having excellent sensory properties and sweetness quality, and specifically, to a beverage containing allulose as a sweetener, for example, a water beverage and a gel-phase beverage.

In an embodiment, the present invention relates to a water beverage comprising a sweetener containing an allulose, an acidity regulator, probiotic microorganisms and water, and a method for preparing the same, and more specifically, a water beverage having a water content of 90% by weight or more based on 100% by weight of the total water beverage and a solid content of allulose of 0.05 to 3% by weight.

The water content of the water beverage according to the present invention can be 90% by weight or more, 91% by weight or more, 92% by weight or more, 93% by weight or more, 93.5% by weight or more, or 94% by weight or more, based on 100% by weight of the total beverage, and for example, can be 90 to 99% by weight based on 100% by weight of the total beverage. To prepare the water beverage, water may be added, or one or more selected from the group consisting of a fruit flesh, fruit juice, vegetable juice, additional saccharide solution, and a solution of probiotic microorganisms may be additionally added to the water.

In the water beverage of the present invention, the total solid content may be 10% by weight or less, 9% by weight or less, 8% by weight or less, 7% by weight or less, 6.5% by weight or less or 6% by weight or less, or for example 0.1 to 10% by weight, based on 100% by weight of the total solid content of the beverage.

The beverage of the present invention can be a water beverage, and thus preferably has a degree of transparency similar to water, and ΔE*ab in storage period can be 0.05 to 5.0, 0.1 to 5.0, 0.05 to 3.0, 0.1 to 3.0, 0.05 to 2.0 or 0.1 to 2.0. The transparency of the beverage corresponds to L value, when measuring L, a, and b with a color-difference meter, and the water beverage has the transparency similar to that of water and preferably does not brown.

The water beverage of the present invention may be a low-calorie beverage because allulose alone or in combination with other saccharides can replace all or a part of a conventional saccharide with high-calorie. The water beverage of the present invention may have 100 kcal or less, 40 kcal or less, 35 kcal or less, or 30 kcal or less per 100 g of beverage. According to the detailed standard for nutrient content claim in the Korean food labeling standards, the term, 'low calories' can be marked when the food has less than 40 kcal per 100 g of food, or less than 20 kcal per 100 mL of food.

The acidity of the water beverage according to the present invention may be 0.05 to 1.0, 0.1 to 1.0, 0.05 to 0.5, 0.1 to 0.5, 0.05 to 0.3, 0.1 to 0.3, 0.1 to 0.2, 0.1 to 0.17, or 0.1 to 0.15. Herein, the term 'acidity' refers to the capacity to neutralize alkalinity, and is defined below pH8.5. That is, it refers to the number of equivalent of alkaline solution required to titrate, when titrating a certain amount of sample to a constant pH with a strong alkaline standard solution. For example, it can be measured using an acidity meter.

The water beverage of the present invention may be pH 2.5 to 4.0, or pH 2.8 to 3.8.

The water beverage according to the present invention may have a sweetness degree of 1 to 20, 1 to 15, 1 to 10, 3 to 20, 3 to 15, 3 to 10, or 5 to 20, based on the sweetness degree of 1% (w/w) sugar aqueous solution set to 1 of sweetness degree. When a high intensity sweetener is used as an additional sweetener in a water beverage, the sweetness degree may be a sweetness degree of 5 to 20, 10 to 20, or 15 to 20. In addition, the water beverage may have a sourness degree of 0.05 to 1.0, 0.05 to 0.8, 0.05 to 0.5, 0.1 to 1.0, 0.1 to 0.8, or 0.1 to 0.5 based on the sourness level of the 1% (w/w) citric acid solution set to 1 of sourness degree. In addition, according to the criteria of the degrees of sweetness and sourness, the ratio of the sweetness degree to the sourness degree (=sweetness/sourness) of the water beverage according to the present invention can be 1:1 to 40:1, 3:1 to 40:1, 4.5:1 to 40:1, 1:1 to 35:1, 3:1 to 35:1, 4.5:1 to 35:1, 1:1 to 30:1, 3:1 to 30:1, 4.5:1 to 30:1, 1:1 to 25:1, 3:1 to 25:1, 4.5:1 to 20:1, 1:1 to 20:1, 3:1 to 20:1, 4.5:1 to 20:1, 1:1 to 15:1, 3:1 to 15:1, 4.5:1 to 15:1, 1:1 to 15:1, 3:1 to 15:1, or 4.5:1 to 15:1.

Allulose can be contained at the solid content of 0.05 to 3% by weight, 0.075 to 3% by weight, 0.1 to 3% by weight, 0.05 to 2.5% by weight, 0.075 to 2.5% by weight, 0.1 to 2.5% by weight, 0.05 to 2% by weight, 0.075 to 2% by weight %, or 0.1 to 2% by weight, based on 100% by weight of the water beverage.

In another embodiment, the present invention relates to a gel-phase beverage containing allulose, and more particularly a gel-phase beverage comprising a gelling agent including gellan gum, a sweetener including allulose and an organic acid or a salt thereof. The gel-phase beverage may further include a cationic gelling accelerator that increases gel strength by crosslinking with a gelling agent, and may further include erythritol in addition to allulose as a sweetener.

The water content of the gel-phase beverage according to the present invention may be 50% by weight or more, or for example, 70 to 99% by weight based on 100% by weight of the beverage. Accordingly, the beverage in the present invention has a water content of 50% by weight or more, 55% by weight or more, 60% by weight or more, 65% by weight or more, or 70% by weight or more, which means drinkable property. To prepare the gel-phase beverage, water may be added or mixed additionally with fruit juice, vegetable juice and the like.

The gel-phase beverage of the present invention is gel-phase at the temperature range of 1 to 35° C., or preferably 3 to 26° C.

The gel-phase beverage of the present invention may not contain one or more selected from the group consisting of carbon dioxide and emulsifier. In addition, the gel-phase beverage of the present invention may have one or more properties selected from the group consisting of the following properties: (1) hardness of 10 to 500 g, 50 to 500 g, 100 to 500 g, 10 to 450 g, 50 to 450 g, 100 to 450 g, 10 to 450 g, 50 to 450 g, 100 to 450 g, or 100 to 400 g, (2) acidity of 0.05 to 1.0, 0.05 to 0.8, 0.1 to 1.0, or 0.1 to 0.8, and (3) water release rate of 6.8% or lower as measured after storing for 10 days at 35° C.

The gel-phase beverage of the present invention can replace all or part of the conventional high-calorie saccharides with allulose alone or in combination with other saccharides, and thus may be a low-calorie beverage product. The gel-phase beverage of the present invention may be 100 kcal or less, 50 kcal or less, 45 kcal or less, or 40 kcal or less per 100 g of beverage. According to the detailed standard for nutrient content claim in the Korean food labeling standards, the label of 'low calories' can be marked when the food has less than 40 kcal per 100 g of food, or less than 20 kcal per 100 mL of food.

The gel-phase beverage of the present invention may have a sweetness of 1 to 20, or 5 to 20 based on the sweetness degree of 1% (w/w) sugar solution set to 1 of sweetness degree, and when a high intensity sweetener is used as an additional sweetener, the sweetness degree of beverage may have 10 to 20, or 15 to 20. In addition, the beverage has a sourness degree of 0.05 to 1.0, 0.05 to 0.8, 0.05 to 0.5, 0.1 to 1.0, 0.1 to 0.8, 0.1 to 0.5, 0.2 to 1.0, 0.2 to 0.8 or 0.2 to 0.5 based on 1 of the sourness degree of 1% (w/w) citric acid aqueous solution. In addition, according to the criteria of the degree of sweetness and sourness, the ratio of sweetness to sourness (=sweetness degree/sourness degree) of the gel-phase beverage of the present invention may be 10:1 to 40:1.

Herein, the gel refers to a semi-solid form of material prepared by using a gelling agent, and to the semi-solid form of the colloidal solution which is solidified with the dispersion medium. Herein, the gel has the same meaning as gel itself in a narrow meaning.

The gel-phase beverage of the present invention includes a gelling agent to obtain a gel phase, and has a gel phase in the temperature range of 1 to 30° C., so as to show phase retention and fluidity. Thus, the gel-phase beverage of the present invention may have a hardness of 10 to 500 g, 50 to 500 g 100 to 500 g, 10 to 450 g, 50 to 450 g 100 to 450 g, 10 to 450 g, 50 to 450 g 100 to 450 g, or 100 to 400 g.

The gelling agent applied to the present invention is capable of gelation in the temperature range of 1 to 30° C., and preferably can stably maintain the gel phase. The gelling agent essentially contains gellan gum, and optionally at least one selected from the group consisting of xanthan gum and locust bean gum. The gelling agent may include 0 to 200 parts by weight of at least one selected from the group consisting of xanthan gum and locust bean gum, based on 100 parts by weight of gellan gum.

The amount of the gelling agent can be 0.01 to 2.0% by weight based on 100% by weight of total amount of gel-phase beverage. In order that the good feeling of the beverage to go through throat can be enjoyed, small and soft gel mass is preferred over large and hard gel mass. The gellan gum may be included in an amount of 0.005 to 1.5% by weight based on 100% by weight of total amount of gel-phase beverage.

The gellan gum (GELLAN GUM) is a high-molecular polysaccharide composed of rhamnose, glucuronic acid, and glucose at ratio of 1:1:2, and is a tasteless, odorless white powder. When gellan gum is to be gellified, it does not dissolve well in water. It is dispersed in water and then dissolved by heating at 90° C. or higher, and then can be added with cation to form an elastic gel. The gels of gellan gum are colorless and transparent, and are widely used due to their high heat resistance, acid resistance, and enzyme resistance. Locust bean gum is preferred, because it has a higher ratio of mannose to galactose than other galactomannans.

The gel-phase beverage of the present invention optionally includes a cationic gelling accelerator and can significantly increase the strength of sustained release gel. Specific examples of the cationic gelling accelerator include salts that produce monovalent or polyvalent metal cations. Examples of preferred salts include inorganic and organic salts of various alkaline metal and/or alkaline earth metals. Examples of inorganic salts include sulfates, chlorides, borates, carbonates, phosphates and bromides of alkaline metal and/or alkaline earth metal. Examples of organic salts include citrate, acetate, lactate, and the like of alkaline metal and/or alkaline earth metal. Sodium, potassium and the like are preferred as the alkaline metal. Magnesium, calcium and the like are preferred as alkaline earth metals. Examples of the cationic gelling accelerator may be one or more cations selected from the group consisting of sodium, magnesium, potassium and calcium ions, or salts thereof. Specific examples include at least one selected from the group consisting of calcium sulfate, sodium chloride, potassium sulfate, sodium carbonate, lithium chloride, tribasic potassium phosphate, sodium borate, potassium bromide, potassium fluoride, sodium bicarbonate, calcium chloride, magnesium chloride, sodium acetate, sodium citrate, calcium citrate, calcium gluconate, calcium glycerophosphate, calcium oxide, calcium chloride, calcium lactate, calcium stearyllactate, calcium triphosphate, calcium diphosphate, calcium carbonate, calcium sulfate, shell-fermented organic calcium, egg shell calcium, and potassium chloride. It may be more than a species. The cationic gelling accelerator is preferably a calcium ion or a salt providing the same, and may be, for example, calcium lactate.

The cationic gelling accelerator of the present invention is contained in an amount effective to obtain the desired gel strength. In a preferred embodiment, the content of cationic gelling accelerator may be 0.001 to 1.0% by weight, 0.05 to 1.0% by weight, 0.001 to 0.5% by weight, or 0.05 to 0.5% by weight, based on 100% by weight of an total amount of beverage.

The gel-phase beverage of the present invention essentially contains allulose as a saccharide. The allulose can be contained at an amount suitable for the sweetness degree and sensory properties, and the solid content of allulose is 0.1 to 30% by weight, 1 to 30% by weight, 3 to 30% by weight, 5 to 30% by weight, 0.1 to 25% by weight, 1 to 25% by weight, 3 to 25% by weight, 5 to 25% by weight, 0.1 to 20% by weight, 1 to 20% by weight, 3 to 20% by weight, or 5 to 20% by weight, based on 100% by weight of the beverage. In addition, in the case of using allulose syrup having a solid content of 70 brix and an allulose purity of 90%, the amount of allulose solution is 5 to 40% by weight, 5 to 35% by weight, or 5 to 30% by weight based on 100% by weight of the beverage.

In the present invention, the allulose can be prepared by chemical synthesis or a biological method using an allulose epimerase, and preferably can be produced by a biological method, for example, a microorganism or an enzymatic reaction. For example, the allulose is provided as a mixed saccharide or obtained therefrom. The mixed saccharide can be prepared by reacting a fructose-containing raw material with an allulose-producing composition including at least one selected from the group consisting of an allulose epimerase, a microbial cell of a strain producing the enzyme, a culture of the strain, a lysate of the strain, and an extract of the culture and lysate.

Allulose included in the beverage composition of the present invention may be in the form of syrup or powder. The allulose syrup may be solutions having various concentrations which are prepared by using allulose. For example, the solid content of allulose in the allulose syrup may be 10 to 100% by weight, preferably 70 to 99.99% by weight, or more preferably 90 to 99.99% by weight, based on 100% by weight of allulose syrup. In case of use of the allulose powder, for example including allulose having a purity of 90% or more, the solid content of allulose powder may be 90 to 99.99% by weight, or more preferably 95 to 99.99% by weight, based on the total solid content of composition.

The allulose syrup may be obtained by separating, purifying and concentrating processes from the allulose alone or mixed saccharide. In an embodiment of the present invention, the allulose syrup obtained by undergoing the separation and purification process has an electric conductivity of 1 to 50 µS/cm, and may be liquid allulose syrup which is colorless or light yellow and has sweetness. The allulose solution may have a pH 4 to 6. The allulose may be allulose alone or a mixed saccharide containing additional other saccharides, and an exemplary mixed sugar may contain 1 to 99.9% by weight of allulose based on 100% by weight of the total solid content of the mixed saccharide, and additionally include one or more selected from the group consisting of fructose and glucose. When the mixed saccharide containing allulose includes fructose and/or glucose, the mixed saccharide may include 1 to 90% by weight of fructose and/or 1 to 50% by weight of glucose.

Specific examples of the allulose-containing mixed saccharide includes 5 to 95 parts by weight of allulose, 1 to 50 parts by weight of fructose and 1 to 55 parts by weight of glucose, and 1 to 10 parts by weight of oligosaccharide, based on 100 parts by weight of the total solid content of the mixed saccharide. Alternatively, it may not contain oligosaccharides. The allulose, fructose and glucose are preferably all D-isomers.

The water beverage according to the present invention may include, in addition to allulose, one or more additional sweeteners selected from the group consisting of sugar, fructose, glucose, isomerized saccharide, sugar alcohol, and high intensity sweetener. The sugar alcohol includes erythritol, sorbitol, mannitol, lactitol, maltitol, xylitol, or a combination of two or more thereof. The high intensity sweeteners include may be one or more selected from the group consisting of aspartame, acesulfame K, sodium cyclamate, sodium saccharin, sucralose, stevia sweetener (steviol glycoside, enzymatically treated stevia), dulcine, thaumatin, tomatine, neotame, rebaudioside A and monelin.

The water beverage according to the present invention may include an organic acid or a salt thereof to impart a sour taste to the beverage and adjust the acidity. The organic acid may be at least one selected from the group consisting of citric acid, malic acid, tartaric acid, and lactic acid, and the salts thereof. The salt of organic acid includes an alkaline metal salt or an alkaline earth metal salt such as sodium, magnesium, calcium, and potassium of the organic acids. The water beverage according to the present invention can achieve an acidity of 0.05 to 1.0, by including an organic acid or a salt thereof, and the content of the organic acid can be selected in an amount suitable to control the taste and acidity of the beverage, and for example, it may be 0.05 to 1.0% by weight based on 100% by weight of total amount of the beverage.

The water beverage according to the present invention may include probiotic microorganisms, for example, lactic acid bacteria, which may be used as dead or live microorganisms or may be added in a form of liquid or powder. The solid content of lactic acid bacteria used in the beverage of the present invention is 0.0001 to 1.0% by weight, 0.0001 to 0.5% by weight, 0.0001 to 0.1% by weight, 0.005 to 1.0% by weight, 0.005 to 0.5 wt %, 0.005 to 0.1 wt %, 0.0075 to 1.0 wt %, 0.0075 to 0.5 wt %, or 0.0075 to 0.1 wt % based on 100% by weight of the total water beverage. In the present invention, the beverage may provide functionality and/or flavor by applying the lactic acid bacteria, and does not generate precipitation, even if it contains lactic acid bacteria and does not contain a stabilizer, for example, soybean polysaccharide.

Examples of probiotic microorganisms that can be used in the present invention may include, but are not limited to, *Lactobacillus* sp., *Bifidobacterium* sp., *Streptococcus* sp., *Lactococcus* sp. and *Enterococcus* sp. Specifically, the non-limiting examples of *Lactobacillus* sp. found in the human intestine include *Lactobacillus fermentum, L. acidophilus, L. casei, L. saliva loss (L. saliva roes), L. brevis, L. leichmannii, L. plantarum, L. cellobiosus, L. luteri, L. rhamnosus, L. rhamnosus, L. GG, L. bulgaricus*, and *L. thermophilus*. The non-limiting examples of *Bifidobacterium* sp. include *B. angulatum, B. animalis, B. asteroids, B. bifidum, B. bourn, B. breve, B. catenulatum, B. choerinum, B. coryneforme, B. cuniculi, B. dentium, B. gallicum, B. gallinarum, B. indicum, B. longum, B. magnum, B. merycicum, B. minimum, B. pseudocatenuratum, B. pseudocatenulatum, B. pseudolongum, B. psychraerophilum, B. pullorum, B. ruminantiurn, B. saeculare, B. scardovii, B. simiae, B. subtile, B. thermacidophilum, B. thermophilum*, and *B. urinalis*. The non-limiting examples of *Streptococcus* sp. include *Streptococcus salivarus* and *Streptococcus cremoris*.

The water beverage according to the present invention may further include one or more selected from the group consisting of fruit flesh, fruit juice, vegetable juice, flavoring agent, nutrient, and coloring agent, if necessary. The fruit juice may be one or more selected from the group consisting of apple, strawberry, grape, pear, peach, tangerine, pineapple, mango, lemon, cherry and blueberry, or may be concentrated fruit juices of the fruit juices, but is not limited thereto. The vegetable juice may be one or more selected from the group consisting of carrot, broccoli, onion, radish, tomato, cabbage, celery, green pepper, pumpkin and kale, and may also be concentrated vegetable juices of the vegetable juices, but is not limited thereto. The flavoring agent is one or more selected from the group consisting of yogurt flavor, apple flavor, banana flavor, pear favor, apricot flavor, peach flavor, orange flavor, lemon flavor, grapefruit flavor, and lime flavor, but is not limited thereto. In order to impart proper sensory properties to the water beverage of the present invention, the kind and content of the flavoring agent may be appropriately adjusted, and for example, it may be used in an amount of 0.01 to 0.3% by weight.

The saccharides added to the gel-phase beverage of the present invention include allulose and erythritol, for example, which can include for erythritol at an solid content of 25 to 650 parts by weight, 30 to 400 parts by weight, or 50 to 350 parts by weight, based on 100 parts by weight of the solid content of allulose. The saccharide in the gel-phase beverage of the present invention is a very low calorie sweetener and has a sweetness degree of about 70% of sugar.

The gel-phase beverage according to the present invention may include, in addition to allulose, one or more additional sweeteners selected from the group consisting of sugar, fructose, glucose, isomerized saccharides, sugar alcohols, and high intensity sweeteners. The sugar alcohol includes erythritol, sorbitol, mannitol, lactitol, maltitol, xylitol, or a combination of two or more thereof. The high intensity sweeteners include at least one selected from the group consisting of aspartame, acesulfame K, sodium cyclamate, sodium saccharin, sucralose, stevia sweetener (steviol glycoside, enzymatically treated stevia), dulcine, thaumatin, tomatine, neotame, rebaudioside A and monelin.

The gel-phase beverage of the present invention may include an organic acid or a salt thereof to impart a sour taste to the beverage and control the acidity. The organic acid may be at least one selected from the group consisting of citric acid, malic acid, tartaric acid, and lactic acid, and the salts of the organic acids include an alkaline metal salt or an alkaline earth metal salt such as sodium, magnesium, calcium, and potassium of the organic acids. The beverage of the present invention can achieve an acidity of 0.05 to 1.0, by including an organic acid or a salt thereof, and the content of the organic acid can be selected in an amount suitable to control the taste and acidity of the beverage, and for example, it may be 0.05 to 1.0% by weight, based on 100% by weight of total amount of gel-phase beverage.

The gel-phase beverage according to the present invention may further include one or more selected from the group consisting of thickeners, fruit fleshes, fruit juices, vegetable juices, seeds, flavors, nutrients, and coloring agents, if necessary. The fruit juice is a juice of one or more fruits selected from the group consisting of apples, strawberries, grapes, pears, peaches, tangerines, pineapples, mangoes, lemons, cherries and blueberries, or may be concentrated fruit juices of the fruit juice, but is not limited thereto. The vegetable juice may be a juice of one or more vegetables selected from the group consisting of carrot, broccoli, onion, radish, tomato, Chinese cabbage, celery, green pepper, pumpkin, and kale, and may also be concentrated juices of the vegetable juices but is not limited thereto.

Advantageous Effects

The present invention relates to a low-calorie beverage composition containing allulose, such as a low-calorie water beverage, and more particularly, to a water beverage with an imparted taste and/or flavor, low calorie, excellent sensory properties and functionality. As another example, it is possible to provide a gel-phase beverage capable of reducing saccharides, having high strength of gel-phase and stably maintaining the gel phase.

BRIEF DESCRIPTION OF THE DRAWINGS

FIG. 1 is a graph showing the results of measuring the degree of browning change in a water beverage according to Test Example 3 of the present invention.

FIG. 2 is a graph showing the result of evaluating the water release rate of a gel-phase beverage according to an example of the present invention.

DETAILED DESCRIPTION OF THE EMBODIMENTS

The present invention will be described in more detail with reference to the following examples, but the scope of the present invention is not limited to the scope of the following examples.

Examples 1 to 4: Preparation of Water Beverage

25% of the sugar amount in Example 1, 50% of the sugar amount in Example 2, 75% of the sugar amount in Example 3 and 100% of the sugar amount in Example 4 were replaced.

Specifically, the used galacto-oligosaccharide was galacto-oligosaccharide (75 brix) of Samyang Corporation, and sugar was white sugar of Samyang Corporation. The yogurt flavor was products by Samhwa F & F and Showa Nogei, and the purified water was used. In Table 1, the commercial product of live lactic acid bacterium (*Lactobacillus fermentum*) was purchased and used. Table 1 shows the composition of each components represented by unit (% w/w).

Allulose A used in this Example was 70 Brix allulose syrup which included 10 to 16% (w/w) of allulose, 40 to 50% (w/w) of fructose, 35 to 45% (w/w) of glulcose, and 0 to 5% (w/w) of oligosaccharides based on 100% by weight of the saccharide solid content. Allulose B was 70 Brix allulose syrup which included 95 to 98% (w/w) of allulose, 2 to 5% (w/w) fructose and 0 to 1% (w/w) of glucose. In Examples 1 to 4, allulose A syrup with low-purity was used. In Table 1, the allulose solid contents were 0.13% (w/w) for Example 1, 0.26% (w/w) for Example 2, 0.40% (w/w) for Example 3, and 0.53% (w/w) for Example 4.

TABLE 1

| Component | Comparative Example1 | Example1 | Example2 | Example3 | Example4 |
|---|---|---|---|---|---|
| Lactic acid bacterium | 0.001 | 0.001 | 0.001 | 0.001 | 0.001 |
| Allulose A | no | 1.888 | 3.775 | 5.663 | 7.550 |
| Sugar | 5.200 | 3.900 | 2.600 | 1.300 | no |
| Galacto-oligosaccharide | 0.150 | 0.150 | 0.150 | 0.150 | 0.150 |
| Acidity regulator | 0.160 | 0.160 | 0.160 | 0.160 | 0.160 |
| Yogurt flavor | 0.142 | 0.142 | 0.142 | 0.142 | 0.142 |
| Salt | 0.030 | 0.030 | 0.030 | 0.030 | 0.030 |
| Water | 94.317 | 93.729 | 93.142 | 92.554 | 91.967 |
| sum | 100.000 | 100.000 | 100.000 | 100.000 | 100.000 |

Comparative Example 1: Preparation of Water Beverage

A water beverage was prepared in substantially the same manner as in Example 1, except that sugar was included instead of allulose.

Test Example 1: Properties Evaluation of Water Beverage (1) Measurement of Browning Degree in Storage Period For the beverage products obtained in Examples 1-4 and Comparative Example 1, in order to measure the browning degree during the storage period, L, a, and b values were measured with a color-difference meter after storing for 30 days at 35° C., and the results were shown in Table 2 below.

TABLE 2

| Storage day | Item | Comparative Example1 | Example1 | Example2 | Example3 | Example4 |
|---|---|---|---|---|---|---|
| 0 day | L | 98.66 | 98.68 | 98.76 | 98.75 | 98.81 |
|  | a | 0.05 | 0.05 | 0.03 | 0.03 | 0.02 |
|  | b | 0.85 | 0.84 | 0.78 | 0.75 | 0.75 |
| 30 days | L | 98.41 | 98.49 | 98.55 | 98.58 | 98.76 |
|  | a | −0.06 | −0.04 | −0.04 | −0.02 | −0.02 |
|  | b | 1.25 | 1.18 | 1.22 | 1.25 | 1.28 |
| ΔE*ab | ** | 0.48 | 0.49 | 0.49 | 0.52 | 0.53 |

As shown in the results of Table 2, it was confirmed that the browning hardly occurred within the shelf life in Examples 1 to 3 using the mixture of sugar and allulose, as well as Example 4 using allulose alone. When allulose was applied to beverage, it showed transparency equivalent to sugar, which confirmed allulose as an additive suitable for use in beverage products.

(2) Calorie Analysis of Beverage

For the beverage products obtained in Examples 1-4 and Comparative Example 1, the saccharide amount in 100 g of the beverage was measured by calculating the total contents of monosaccharides and disaccharides according to the instrumental analysis method of the Food Sanitation Act, and the calorific value was obtained according to the theoretical calculation method using nutritional components. They were compared with that of Comparative Example. The results are shown in Table 3 below.

TABLE 3

| Item | Comparative Example1 | Example1 | Example2 | Example3 | Example4 |
|---|---|---|---|---|---|
| Calorie(Kcal/100 g) | 21 | 21 | 20 | 20 | 20 |
| Saccharide(g/100 g) | 5.2 | 5 | 4.9 | 4.7 | 4.5 |

In this experiment, because allulose A (low purity) was used, and the amount of added saccharide was not high, the calorie value was similar. However, the saccharide amount of allulose A (low purity) is less than sugar, and thus, as the higher the allulose content is, the lower the saccharide content is. Therefore, it was confirmed that the present invention could prepare a water beverage equivalent to sugar by using allulose.

(3) pH and Acidity Analysis

For the beverage products obtained in Examples 1-4 and Comparative Example 1, pH and acidity were analyzed. Specifically, pH was measured using a pH meter, and Brix was measured with Digital Refractometer RX-5000-α (ATAGO). The acidity was measured using an acidity meter TA-70 (automatic acidity meter) (TOADKK, Japan). The measured Brix, pH and acidity are shown in Table 4 below.

TABLE 4

| Item | Comparative Example1 | Example1 | Example2 | Example3 | Example4 |
|---|---|---|---|---|---|
| Brix | 5.46 | 5.59 | 5.62 | 5.75 | 5.91 |
| pH | 3.24 | 3.26 | 3.25 | 3.25 | 3.24 |
| Acidity (%) | 0.132 | 0.131 | 0.131 | 0.132 | 0.132 |

Test Example 2: Sensory Evaluation of Beverages

To evaluate the sensory properties of satisfaction and texture satisfaction, the beverages obtained in Examples 1-4 and Comparative Example 1 were placed in the mouth, and the oral epidermis was evenly stimulated for 20 seconds, and then spit out. The mouth was washed with water at every evaluation time when the analysis for one sample was completed. After 10 minutes, the next sample was evaluated, and the sensory elements were displayed as 5-point box scale. The sensory evaluation persons consisted of 80 panelists (male and female with 20 to 40s ages) who were professionally trained for the evaluation of taste and flavor. The evaluation criteria of the sensory elements are as follows, and the results are shown in Table 5 below.

[Evaluation Criteria]

Flavor degree (very low 1-very high 5)
Sweetness degree (very low 1-very high 5)
Sourness degree (very low 1-very high 5)
Refreshing sensation (very low 1-very high 5)
Taste harmony (very bad 1-very good 5)
Overall satisfaction (very bad 1-very good 5)

TABLE 5

| Evaluation item | Comparative Example1 | Example1 | Example2 | Example3 | Example3 |
|---|---|---|---|---|---|
| Flavor degree | 3.3 | 3.1 | 3.2 | 3.2 | 3.2 |
| Sweetness degree | 2.5 | 2.5 | 2.6 | 2.5 | 2.5 |
| Sourness degree | 2.4 | 2.4 | 2.3 | 2.3 | 2.4 |
| Refreshing sensation | 2.9 | 2.9 | 3.0 | 3.1 | 3.4 |
| Taste harmony | 3.2 | 3.3 | 3.4 | 3.4 | 3.3 |
| Overall satisfaction | 3.6 | 3.6 | 3.7 | 3.6 | 3.6 |

In Example 1-4 and Comparative Example 1, the sweetness degrees of the products were equivalent, because allulose A (low purity) was used at an amount that could achieve the same sweetness in consideration of the relative sweetness of allulose to sugar. The allulose had a relative sweetness of about 92 to 95% compared to sugar. In addition, the beverage compositions of Examples 1 to 4 gave a refreshing feeling due to added allulose, compared to Comparative Example 1 containing only sugar. Overall satisfaction was high in the beverage of Example 2 in which sugar and allulose were mixed.

Examples 5 to 8: Preparation of Water Beverage Preparation

The beverages were prepared in substantially the same manner as in Example 1 according to the ingredients and the compositions of Table 6 below.

25% of the fructose syrup amount in Example 6, 50% of the fructose syrup amount in Example 7, 75% of the fructose syrup amount in Example 8 and 100% of the fructose syrup amount in Example 9 were replaced. Specifically, lactic acid bacteria, allulose and galacto-oligosaccharide were used as the same as in Example 1. For the fructose syrup, the fructose syrup with 75 brix solid content of Samyang Corporation was used. The concentrated peach juice produced by Commax (Israel) was added to be 1% by weight of peach juice. The peach flavor was products of Samhwa F & F and Showa Nogei. The purified water was used, and citric acid was used as the acidity regulator. Table 6 shows the compositions of specific components as a unit (w/w %). In Table 6, based on 100% by weight of the water beverage, the allulose solid content was 0.13% by weight for Example 5, 0.26% by weight for Example 6, and 0.40% by weight for Example 7, and 0.53% by weight for Example 8.

TABLE 6

| Components | Comparative Example2 | Example5 | Example6 | Example7 | Example8 |
|---|---|---|---|---|---|
| Lactic acid bacterium | 0.001 | 0.001 | 0.001 | 0.001 | 0.001 |
| Alullose A | no | 1.888 | 3.775 | 5.663 | 7.550 |
| Fructose syrup | 6.920 | 5.190 | 3.460 | 1.730 | no |
| Galacto-oligosaccharide | 0.150 | 0.150 | 0.150 | 0.150 | 0.150 |
| Acidity regulator | 0.175 | 0.175 | 0.175 | 0.175 | 0.175 |
| Peach flavor | 0.100 | 0.100 | 0.100 | 0.100 | 0.100 |
| Concentrated peach juice | 0.103 | 0.103 | 0.103 | 0.103 | 0.103 |
| Salt | 0.030 | 0.030 | 0.030 | 0.030 | 0.030 |
| water | 92.521 | 92.363 | 92.206 | 92.048 | 91.891 |
| Sum | 100.000 | 100.000 | 100.000 | 100.000 | 100.000 |

Comparative Example 2: Preparation of Water Beverage

Beverages were prepared in substantially the same manner as in Example 5, except that fructose syrup was used instead of allulose.

Test Example 3: Properties Evaluation of Water Beverage (1) Measurement of Browning Degree During Storage For the beverage products obtained in Examples 5 to 8 and Comparative Example 2, in order to measure the browning degree during the storage period, L, a, and b values were measured with a color-difference meter shortly after the preparation of the beverage, and after storing for 30 days at 35° C., and the results were shown in Table 7 below. ΔE*ab obtained from the experiment was shown in FIG. 1

TABLE 7

| Storage day | Item | Comparative Example2 | Example5 | Example6 | Example7 | Example8 |
|---|---|---|---|---|---|---|
| 0 day | L | 98.51 | 98.58 | 98.61 | 98.76 | 98.82 |
|  | a | −0.15 | −0.10 | −0.04 | −0.02 | 0.02 |
|  | b | 1.00 | 0.94 | 0.88 | 0.81 | 0.75 |
| 30 days | L | 98.66 | 98.51 | 98.55 | 98.60 | 98.76 |
|  | a | −0.22 | −0.17 | −0.10 | −0.07 | −0.02 |
|  | b | 2.40 | 1.98 | 1.80 | 1.37 | 1.28 |
| ΔE*ab |  | ** | 1.41 | 1.04 | 0.92 | 0.58 | 0.53 |

As shown in Table 7, Comparative Example 2 using only fructose syrup had the highest ΔE*ab and decreased gradually as the allulose amount increased, so that Examples containing allulose had lower degree of browning compared to the fructose syrup, but was almost similar to.

(2) Calorie Analysis of Beverage

For the beverage products obtained in Examples 5-9 and Comparative Example 2, the total saccharide content in the 100 g of the beverage was measured by calculating the total contents of monosaccharides and disaccharides according to the instrumental analysis method of the Food Sanitation Act, and the calorific value was obtained by performing the theoretical calculation method using nutritional components. They were compared with the Comparative Example composition. The results are shown in Table 8 below.

TABLE 8

| Item | Comparative Example2 | Example5 | Example6 | Example7 | Example8 |
|---|---|---|---|---|---|
| Calorie(Kcal/100 g) | 21.5 | 21 | 21 | 20 | 20 |
| Saccharide(g/100 g) | 5.2 | 5 | 4.9 | 4.7 | 4.5 |

In this experiment, because allulose A (low purity) was used, and the amount of added saccharide was not high, the calorie values were not significantly different and but decreased by about 15%. However, the saccharide amount of allulose A (low purity) is less than sugar, and thus, as the higher the allulose content is, the lower the saccharide content is. Therefore, it was confirmed that the present invention could prepare a water beverage equivalent to sugar by using allulose.

(3) pH and Acidity Analysis

For the beverage products obtained in Examples 5-9 and Comparative Example 2, pH and acidity were analyzed. Specifically, pH was measured using a pH meter, and Brix was measured with Digital Refractometer RX-5000-α (ATAGO). The acidity was measured using an acidity meter TA-70 (automatic acidity meter) (TOADKK, Japan). The measured Brix, pH and acidity are shown in Table 9 below.

TABLE 9

| Item | Comparative Example2 | Example 5 | Example 6 | Example 7 | Example 8 |
|---|---|---|---|---|---|
| Brix | 5.51 | 5.64 | 5.78 | 5.83 | 5.96 |
| pH | 3.12 | 3.13 | 3.12 | 3.12 | 3.13 |
| Acidity (%) | 0.135 | 0.134 | 0.134 | 0.135 | 0.135 |

In Table 9, the Brix of the beverage showed a difference as the allulose content increased, because allulose A (low purity) was used at a content that could achieve the same sweetness. However, in the beverages containing fructose syrup and allulose, the pH and acidity were almost equal.

Test Example 4: Sensory Evaluation of Beverages

To evaluate the sensory properties of satisfaction and texture satisfaction, the beverages obtained in Examples 5 to 8 and Comparative Example 2 were placed in the mouth, and the oral epidermis was evenly stimulated for 20 seconds, and then spit out.

The mouth was washed with water at every evaluation time when the analysis for one sample was completed. After 10 minutes, the next sample was evaluated, and the sensory elements were displayed as 5-point box scale. The sensory evaluation members consisted of 80 panelists (male and female with 20 to 40 s ages) who were professionally trained for the evaluation of taste and flavor. Evaluation criteria of the sensory elements are as follows. The evaluation criteria of the above items are the same as those of Test Example 2.

TABLE 10

| Evaluation item | Comparative Example2 | Example5 | Example6 | Example7 | Example8 |
|---|---|---|---|---|---|
| Flavor degree | 3.7 | 3.8 | 3.7 | 3.7 | 3.8 |
| Sweetness degree | 2.5 | 2.5 | 2.7 | 2.7 | 2.6 |
| Sourness degree | 2.7 | 2.7 | 2.6 | 2.6 | 2.4 |
| Refreshing sensation | 3.1 | 3.1 | 3.1 | 3.2 | 3.5 |
| Taste harmony | 3.4 | 3.4 | 3.5 | 3.5 | 3.4 |
| Overall satisfaction | 3.2 | 3.2 | 3.4 | 3.4 | 3.3 |

As shown in Table 10, the beverage compositions of Examples 5 to 8 could show equivalent sweetness compared to the Comparative Example 2 containing only sugar, and also imparted a refreshing feeling due to the added allulose. The overall satisfaction was high in the beverage compositions of Examples 6 to 7 in which fructose syrup and allulose were mixed.

Examples 9 to 12: Water Beverage Preparation

The water beverages were prepared in the same manner as in Example 1, except that a mixture of sucralose and allulose as the sweeteners in Examples 9 and 10, and a mixture of steviol glycoside and allulose as the sweeteners in Examples 11 and 12. Table 11 shows the specific beverage ingredients and mixing ratios.

Specifically, the lactic acid bacteria and galacto-oligosaccharide were used as the same in Example 1. Unlike Examples 1 to 8 using a low-purity product, these Examples used allulose B of 70 Brix allulose syrup which include 95 to 98% (w/w) of allulose, 2 to 5% (w/w) of fructose and 0 to 1% (w/w) of glucose, based on 100% by weight of saccharide solid content. In Examples, allulose B syrup with high purity was used. Sucralose was used by the product of Samyang Corporation, and Steviol Glycoside was the product of Daepyung Food Co., Ltd. The concentrated pear juice produced by Commax (Israel) was added to be 1% by weight of pear juice. The pear flavor was product of Showa Nogei. The purified water was used. Table 11 shows the compositions of specific components as a unit (w/w %). In Table 11, based on 100% by weight of the water beverage, the allulose solid content was 0.33% by weight for Examples 1 and 3 and 0.67% by weight for Examples 2 and 4.

TABLE 11

| Components | Comparative Example 3 | Example 9 | Example 10 | Comparative Example 4 | Example 11 | Example 12 |
|---|---|---|---|---|---|---|
| Lactic acid bacterium | 0.001 | 0.001 | 0.001 | 0.001 | 0.001 | 0.001 |
| Alullose B (liquid) | no | 0.500 | 1.000 | no | 0.500 | 1.000 |
| Sucralose | 0.008 | 0.008 | 0.008 | no | no | no |
| Steviol Glycoside | no | no | no | 0.020 | 0.020 | 0.020 |
| Acidity regulator | 0.155 | 0.155 | 0.155 | 0.155 | 0.155 | 0.155 |
| Pear flavor | 0.084 | 0.084 | 0.084 | 0.084 | 0.084 | 0.084 |
| Concentrated pear juice | 0.340 | 0.340 | 0.340 | 0.340 | 0.340 | 0.340 |
| Salt | 0.030 | 0.030 | 0.030 | 0.030 | 0.030 | 0.030 |
| water | 99.382 | 98.882 | 98.382 | 99.370 | 98.870 | 98.370 |
| Sum | 100.000 | 100.000 | 100.000 | 100.000 | 100.000 | 100.000 |

Comparative Examples 3 To 4: Water Beverage Preparation

Comparative Example 3 was performed in substantially the same manner as in Example 9, except that only sucralose was used instead of allulose.

Comparative Example 4 was performed in substantially the same manner as in Example 11, except that only steviol glycosides were used instead of allulose.

Test Example 5: Properties Evaluation of Water Beverage (1) Measurement of Browning Degree During Storage For the beverage products obtained in Examples 9 to 12 and Comparative Examples 3 to 4, in order to measure the browning degree during the storage period, L, a, and b values were measured with a color-difference meter shortly after the preparation of the beverage, and after storing for 30 days at 35° C., and the results were shown in Table 12 below.

TABLE 12

| Storage day | Item | Comparative Example 3 | Example 9 | Example 10 | Comparative Example 4 | Example 11 | Example 12 |
|---|---|---|---|---|---|---|---|
| 0 day | L | 99.87 | 99.84 | 99.76 | 99.82 | 99.79 | 99.73 |
|  | a | 0.01 | −0.03 | −0.05 | 0.02 | −0.04 | −0.07 |
|  | b | 0.01 | 0.06 | 0.11 | 0.02 | 0.05 | 0.1 |
| 30 days | L | 99.85 | 99.79 | 99.70 | 99.79 | 99.73 | 99.68 |
|  | a | 0.00 | −0.04 | −0.08 | 0.03 | −0.06 | −0.09 |
|  | b | 0.04 | 0.08 | 0.11 | 0.07 | 0.10 | 0.14 |
| ΔE*ab | ** | 0.04 | 0.05 | 0.07 | 0.06 | 0.08 | 0.07 |

As shown in Table 12, Comparative Example 3 using only sucralose had the lowest ΔE*ab and gradually increased as the amount of allulose was increased. The browning degrees of the Examples using allulose were almost similar to those using sucralose alone or steviol glycoside alone.

(2) Calorie Analysis of Water Beverage

For the beverage products obtained in Examples 9-12 and Comparative Examples 3 to 4, the saccharide amount in 100 g of the beverage was measured by calculating the total contents of monosaccharides and disaccharides according to the instrumental analysis method of the Food Sanitation Act, and the calorific value was obtained according to the theoretical calculation method using nutritional components. They were compared with that of Comparative Example. The results are shown in Table 13 below.

TABLE 13

| Item | Comparative Example 3 | Example 9 | Example 10 | Comparative Example 4 | Example 11 | Example 12 |
|---|---|---|---|---|---|---|
| Calorie(Kcal/100 g) | 0 | 0 | 0 | 0 | 0 | 0 |
| Saccharide(g/100 g) | 0 | 0 | 0 | 0 | 0 | 0 |

This experiment confirmed that the beverages using allulose achieved the low calories equivalent to Comparative Examples 3 and 4 using sucralose or steviol glycosides.

(3) pH and Acidity Analysis

For the beverage products obtained in Examples 9 to 12 and Comparative Examples 3 to 4, pH and acidity were analyzed. Specifically, pH was measured using a pH meter, and Brix (solid content of saccharide) was measured with Digital Refractometer RX-5000-α (ATAGO). The acidity was measured using an acidity meter TA-70 (automatic acidity meter) (TOADKK, Japan). The measured Brix, pH and acidity are shown in Table 14 below.

TABLE 14

| Item | Comparative Example3 | Example ple 9 | Example ple 10 | Comparative Example 4 | Example ple 11 | Example ple 12 |
|---|---|---|---|---|---|---|
| Brix | 0.27 | 0.59 | 1.02 | 0.28 | 0.61 | 1.04 |
| pH | 3.21 | 3.20 | 3.20 | 3.21 | 3.21 | 3.20 |
| Acidity (%) | 0.134 | 0.134 | 0.135 | 0.134 | 0.135 | 0.135 |

In Table 14, the Brix of the beverage showed a difference as the allulose content increased, because allulose was used at the amount that could achieve the same sweetness degree as Comparative Examples 3 and 4 using sucralose or steviol glycosides. However, in the beverages containing sucralose or steviol glycosides and the beverages containing allulose, the pH and acidity were almost equal.

Test Example 6: Sensory Evaluation of Beverages

To evaluate the sensory properties of satisfaction and texture satisfaction, the beverages obtained in Examples 9 to 12 and Comparative Examples 3 to 4 were placed in the mouth, and the oral epidermis was evenly stimulated for 20 seconds, and then spit out. The mouth was washed with water at every evaluation time when the analysis for one sample was completed. After 10 minutes, the next sample was evaluated, and the sensory elements were displayed as 5-point box scale. The sensory evaluation personnel consisted of 80 panelists (male and female with 20 to 40s ages) who were professionally trained in the evaluation of taste and flavor, and were marked on a 5-point scale. The evaluation criteria of the above items are the same as those of Test Example 2.

As shown in Table 15, the beverage compositions of Examples 9 to 12 could show equivalent sweetness to that of Comparative Example 3 containing only sucralose, and also impart a refreshing feeling due to the added allulose. The overall satisfaction was high in the beverage compositions of Examples 9 to 12 in which sucralose or steviol glycoside was mixed with allulose, compared to the beverage containing sucralose or steviol glycoside alone.

Example 13: Analysis for Sweetness Degree of Sample Sweetener 13-1: Preparation of Sweet Samples The sample sweeteners were prepared with the ingredients and their contents listed in Table 16. The sample sweeteners of Samples 2 to 8 were prepared by mixing the mixture ratio (allulose:erythritol) based on the solid content of allulose and erythritol shown in Table 16 below. The mixed ratios by weight shown in Table 16 below were represented as the solid content weight of allulose:erythritol (A:E).

In addition, Sample 1 was a sample sweetener containing only allulose without erythritol, and Sample 9 was a sample sweetener containing only erythritol without allulose. The allulose and erythritol were used by the products of Samyang Corporation. In Table 16, "A" represents allulose syrup and "E" represents erythritol powder. Allulose B used in this experiment was allulose syrup with 70 Brix which included 95 to 98% (w/w) of allulose, 1 to 10% (w/w) of fructose, and 0 to 1% (w/w) of glucose based on 100% by weight of saccharide solid content. The unit shown in Table 16 is % (w/w), and indicates the mixing weight ratio of allulose and erythritol which is converted based on the solid content of erythritol power and allulose syrup having 95% of allulose purity and 70% by weight of solid content.

TABLE 15

| Evaluation item | Comparative Example3 | Example ple 9 | Example ple 10 | Comparative Example4 | Example ple 11 | Example ple 12 |
|---|---|---|---|---|---|---|
| Flavor degree | 3.4 | 3.5 | 3.5 | 3.7 | 3.8 | 3.8 |
| Sweetness degree | 2.2 | 2.2 | 2.3 | 2.4 | 2.4 | 2.5 |
| Sourness degree | 2.8 | 2.8 | 2.7 | 2.6 | 2.6 | 2.6 |
| Refreshing sensation | 3.0 | 2.7 | 2.3 | 2.2 | 2.0 | 1.6 |
| Sense of taste harmony | 1.8 | 1.8 | 1.5 | 2.9 | 2.5 | 2.3 |
| Overall satisfaction | 3.1 | 3.4 | 3.5 | 2.7 | 3.0 | 3.1 |

TABLE 16

| Sample | Amount of used allulose syrup | Amount of used erythritol power | Mixing weight ratio (A:E) | Mixing weight ratio of the solid content(A:E) | Purified water | Sum |
|---|---|---|---|---|---|---|
| Sample 1 | 20.41 | — | (A 100) | (A 100) | 79.59 | 100.00 |
| Sample 2 | 16.33 | 2.86 | (A:E = 80:20) | 100:26.3 | 80.81 | 100.00 |
| Sample 3 | 15.31 | 3.56 | (A:E = 75:25) | 100:35.0 | 81.13 | 100.00 |
| Sample 4 | 12.25 | 5.72 | (A:E = 60:40) | 100:70.2 | 82.03 | 100.00 |
| Sample 5 | 10.21 | 7.15 | (A:E = 50:50) | 100:105.3 | 82.65 | 100.00 |
| Sample 6 | 8.16 | 8.58 | (A:E = 40:60) | 100:158.1 | 83.26 | 100.00 |
| Sample 7 | 5.10 | 10.75 | (A:E = 25:75) | 100:317.0 | 84.15 | 100.00 |
| Sample 8 | 4.08 | 11.44 | (A:E = 20:80) | 100:421.6 | 84.48 | 100.00 |
| Sample 9 | — | 14.30 | (E 100) | (E 100) | 85.70 | 100.00 |

13-2: Sweetness Analysis

For Samples 1 to 9 prepared in Table 16, the sweetness degree of 10% (w/w) aqueous sugar solution was set as 10 points of standard and the sweetness degrees of Samples 1 to 9 were compared and evaluated. The results are shown in Table 17 below.

TABLE 17

| Sample | Sweetness degree |
|---|---|
| Sample 1 | 10.3 |
| Sample 2 | 10.5 |
| Sample 3 | 10.6 |
| Sample 4 | 11.2 |
| Sample 5 | 11.6 |
| Sample 6 | 10.9 |
| Sample 7 | 10.7 |
| Sample 8 | 10.3 |
| Sample 9 | 9.7 |

As shown in Table 17 above, the sample using a mixture of allulose and erythritol was superior in the evaluation of sweetness to the sample using allulose alone or erythritol alone. Specifically, it was more preferable to use the mixing ratio of allulose syrup and erythritol (based on solid content) at 80:20 to 20:80 ranges, or more suitably 60:40 to 40:60 ranges.

13-3: Sensory Evaluation of Sample Sweetener

The sample sweeteners obtained in Samples 1 to 9 were placed in the mouth, and the oral epidermis was evenly stimulated for 20 seconds, and then spit out. The mouth was washed with water at every evaluation time when the analysis for one sample was completed. After 10 minutes, the next sample was evaluated, and the sensory elements were displayed as 5-point box scale. The sensory evaluation persons consisted of 15 panelists (male and female with 20 to 40s ages) who were professionally trained in the evaluation of taste and flavor, and were marked on a 5-point scale. Evaluation criteria of the items are as follows, and the results are shown in Table 18 below.

[Evaluation Criteria]
Sweetness harmony: very bad (0)↔very good (5)
Sweetness Satisfaction: very bad (0)↔very Good (5)

TABLE 18

| Sample | Sweetness harmony | Sweetness Satisfaction |
|---|---|---|
| Sample 1 | 3.2 | 3.0 |
| Sample 2 | 3.3 | 3.1 |
| Sample 3 | 3.4 | 3.2 |
| Sample 4 | 3.7 | 3.5 |
| Sample 5 | 3.8 | 3.6 |
| Sample 6 | 3.4 | 3.3 |

TABLE 18-continued

| Sample | Sweetness harmony | Sweetness Satisfaction |
|---|---|---|
| Sample 7 | 3.4 | 3.1 |
| Sample 8 | 3.4 | 3.0 |
| Sample 9 | 2.9 | 2.6 |

According to the sensory evaluation results of the sample sweeteners in Table 18, the sweeteners of Samples 2 to 8, which included a mixture of allulose syrup and erythritol, showed higher harmonized taste and satisfaction than the sweeteners using allulose syrup alone or erythritol alone (Samples 1 and 9).

Examples 14 to 18: Preparation of Gel-Phase Beverage

According to the ingredients and the contents shown in Tables 19a and 19b below, a predetermined amount of the gelling agent was added to hot water at a temperature of 70 to 85° C., and was completely dissolved. Then, after adding calcium lactate, sweetener, apple juice concentrate, citric acid, konjac powder, seeds, and apple flavor, the remaining amount of the purified water was added, sterilized at a temperature of 90 to 98° C. for 10 to 90 seconds, and then filled in a wrapping paper and cooled to prepare a gel-phase beverage.

Allulose, erythritol, acesulfame K and sucralose used in the preparation of the beverages were the products of Samyang Corporation. The apple flavor was FG6516-1535 of Samwha F & F. The apple juice concentrate was a product with 72 brix, and the seeds are chia seeds or basil seeds.

The used allulose was the same as in Example 1 as allulose A and allulose B. allulose syrup (Allulose A) was only used in Example 14, allulose syrup (Allulose B) was only used in Example 15, and the mixed sweetener of allulose B and erythritol was used in Examples 16 to 18. Specifically, Example 16 used a mixed sweetener of allulose and erythritol in Sample 3 (A:E=75:25), Example 17 used a mixed sweetener of allulose and erythritol in Sample 5 (A:E=50:50), and Example 18 used a mixed sweetener of allulose and erythritol of Sample 7 (A:E=25:75).

TABLE 19a

| Component | Comparative Example 5 | Comparative Example 6 | Example 14 | Example 15 |
|---|---|---|---|---|
| Sugar | 10.000 | — | — | — |
| Fructose syrup | — | 13.200 | — | — |
| Allulose A | — | — | 14.300 | — |
| Allulose B | — | — | — | 20.410 |
| erythritol | — | — | — | — |

TABLE 19a-continued

| Component | Comparative Example 5 | Comparative Example 6 | Example 14 | Example 15 |
|---|---|---|---|---|
| acesulfame K | 0.0152 | 0.0152 | 0.0152 | 0.0152 |
| Sucralose | 0.0034 | 0.0034 | 0.0034 | 0.0034 |
| Citric acid | 0.280 | 0.280 | 0.280 | 0.280 |
| Gelling agent | 1.000 | 1.000 | 1.000 | 1.000 |
| Calcium lactate | 0.100 | 0.100 | 0.100 | 0.100 |
| Konjac powder | 0.100 | 0.100 | 0.100 | 0.100 |
| Concentrated apple juice | 1.000 | 1.000 | 1.000 | 1.000 |
| Seed | 0.500 | 0.500 | 0.500 | 0.500 |
| Apple flavor | 0.200 | 0.200 | 0.200 | 0.200 |
| Water | Remaining amount | Remaining amount | Remaining amount | Remaining amount |
| Sum | 100.00 | 100.00 | 100.00 | 100.00 |

TABLE 19b

| Component | Example 16 | Example 17 | Example 18 | Comparative Example 7 |
|---|---|---|---|---|
| Sugar | — | — | — | — |
| Fructose syrup | — | — | — | — |
| Allulose A | — | — | — | — |
| Allulose B | 15.308 | 10.205 | 5.103 | — |
| erythritol | 3.575 | 7.150 | 10.725 | 14.300 |
| acesulfame K | 0.0152 | 0.0152 | 0.0152 | 0.0152 |
| Sucralose | 0.0034 | 0.0034 | 0.0034 | 0.0034 |
| Citric acid | 0.280 | 0.280 | 0.280 | 0.280 |
| Gelling agent | 1.000 | 1.000 | 1.000 | 1.000 |
| Calcium lactate | 0.100 | 0.100 | 0.100 | 0.100 |
| Konjac powder | 0.100 | 0.100 | 0.100 | 0.100 |
| Concentrated apple juice | 1.000 | 1.000 | 1.000 | 1.000 |
| Seed | 0.500 | 0.500 | 0.500 | 0.500 |
| Apple flavor | 0.200 | 0.200 | 0.200 | 0.200 |
| Water | Remaining amount | Remaining amount | Remaining amount | Remaining amount |
| Sum | 100.00 | 100.00 | 100.00 | 100.00 |

Comparative Examples 5 to 7: Preparation of Gel-Phase Beverage

According to the ingredients and contents shown in Tables 19a and 19b, the gel-phase beverages were prepared in the same method of Example 14.

Specifically, instead of allulose used in Example 14, Comparative Example 5 used sugar, Comparative Example 6 used fructose syrup (75 Brix), and Comparative Example 7 used only erythritol without allulose. The used sugar and fructose syrup were the products of Samyang Corporation.

Test Example 7: Properties Evaluation of Gel-Phase Beverage

For the gel-phase beverages prepared in Examples 14 to 18 and Comparative Examples 5 to 7, the physicochemical properties, hardness, and water release amount were measured according to the following measurement and analysis methods, and the analysis results are shown in Tables 21 and FIG. 2.

(1) Physicochemical Property Analysis

For the gel-phase beverages prepared in Examples 14 to 18 and Comparative Examples 5 to 7, the saccharide content in the 100 g of the beverage was measured by calculating the total contents of monosaccharides and disaccharides according to the instrumental analysis method of the Food Sanitation Act, and the calorific value was obtained according to the theoretical calculation method using nutritional components. They were compared with the Comparative Example composition. The results are shown in Table 22 below.

(2) Hardness Measurement

The hardness was measured in the following manner to evaluate the soft texture of the gel-phase beverage. The hardness of the sample was measured with a texture analyzer (TA-XT2i, Stable micro system) according to the following measurement conditions. The hardness measurement was repeated 5 times, and the average value is shown in the table below. The hardness of the gel-phase beverage was represented by measuring the force applied in compression of the gel-phase beverage, and the degree was expressed as the weight (g) applied per unit area. A high value of hardness through the texture analyzer means that a lot of force is required for pressing the beverage, and that it has a harder texture. The hardness measurement was measured at 25° C., and the hardness was measured immediately after preparation and after storage at 35° C. for 10 days.

TABLE 20

| Mode | Measure force in compression | Measurement of the force applied in compression |
|---|---|---|
| sample size | 30 W(mm) × 30 L(mm) × 30 H(mm) | Sample in a cube shape with size of width, length and height of 30 mm |
| test speed | 5 mm/s | 5 mm/s of the speed to press sample with probe |
| distance | 30% | the sample was pressed until 30% of the initial height of sample was deformed |
| Probe | 100 mm compression plate | Probe kind |

(3) pH and Acidity Analysis

For the gel-phase beverages prepared in Examples 14 to 18 and Comparative Examples 5 to 7, pH and acidity were analyzed. Specifically, pH was measured using a pH meter, and Brix (solid content of saccharide) was measured with Digital Refractometer RX-5000-α (ATAGO). The acidity is the number of moles of hydroxyl groups (—OH) contained in the chemical formula of the base and is represented as an amount of acid required for the neutralization reaction. The acidity was measured using an acidity meter TA-70 (automatic acidity meter) (TOADKK, Japan), after quantifying the sample. The measured Brix, pH and acidity are shown in following Table 21.

TABLE 21

| Test | Brix | pH | Acidity (%) |
|---|---|---|---|
| Comparative Example 5 | 12.18 | 3.47 | 0.28 |
| Comparative Example 6 | 12.21 | 3.49 | 0.28 |
| Example 14 | 12.2 | 3.46 | 0.28 |
| Example 15 | 12.19 | 3.45 | 0.28 |
| Example 16 | 12.22 | 3.47 | 0.28 |
| Example 17 | 12.2 | 3.45 | 0.28 |
| Example 18 | 12.18 | 3.47 | 0.28 |
| Comparative Example 7 | 12.17 | 3.47 | 0.28 |

As a result of measuring the brix, acidity and pH of the beverages, it was confirmed that the beverages obtained in the Examples of the present invention had properties similar to those of the gel-phase beverages prepared in Comparative Examples 5 to 7.

(4) Amount of Released Water

For the gel-phase beverages prepared in Examples 14 to 18 and Comparative Examples 5 to 7, the rate of water release was measured shortly after the preparation of beverage, and after storing for 10 days at 35° C. Specifically, the beverage was shaken at 100 rpm for 60 minutes, and then filtered with a 60 mesh sieve, to obtain filtrate solution. The filtrate solution was measured as an amount of water release, and the rate of water release was calculated by the following formula. The results are shown in Table 22 and FIG. 2.

Rate of water release (%)=(Filtrate solution weight)/ (Beverage weight)

TABLE 22

|  | Calorie | | Hardness | | Rate of water release (%) | |
| --- | --- | --- | --- | --- | --- | --- |
| Test | Calorie (Kcal/100 g) | Saccharide (g/100 g) | shortly after the preparation | after storing for 10 days | shortly after the preparation | after storing for 10 days |
| Comparative Example5 | 50 | 11 | 220 | 217 | 2.8 | 6.9 |
| Comparative Example 6 | 50 | 11 | 219 | 215 | 2.5 | 7.4 |
| Example 14 | 40 | 9.5 | 221 | 220 | 2.6 | 6.5 |
| Example 15 | 5 | 1 | 215 | 214 | 3.1 | 6.4 |
| Example 16 | 5 | 1 | 214 | 215 | 3.0 | 5.8 |
| Example 17 | 5 | 1 | 215 | 214 | 2.8 | 5.9 |
| Example 18 | 5 | 1 | 215 | 212 | 2.7 | 6.0 |
| Comparative Example7 | 5 | 1 | 213 | 210 | 3.1 | 6.3 |

As shown in the results of physicochemical properties analysis of Table 22, the product applied with allulose A syrup (Example 14) showed the decreased calories by 20% and the saccharide content by 13.65, compared to those of the beverage containing sugar or fructose syrup (Comparative Examples 5 and 6). When allulose B was only applied (Example 15), or when a mixed sweetener of allulose B and erythritol was applied (Examples 16 to 18), the beverage of the present invention had 5 Kcal of a calorie and 1 g of saccharide content, representing that the low calorie and low saccharide products could be developed.

It was confirmed that the beverage of Example achieved the hardness level equivalent to the product using erythritol, because there was no difference in hardness in storage or distribution.

In the beverage of the present embodiment, the rate of water release was reduced due to the allulose and the decreased phase separation in the storage or distribution process. The fact that the phase separation of the beverage was reduced in distribution of the beverage was considered to be excellent in quality stability and confirmed to be excellent in storage stability.

Test Example 8: Sensory Evaluation of Gel-Phase Beverages

To evaluate the sensory properties of satisfaction and texture satisfaction, the beverages obtained in Examples 14 to 18 and Comparative Examples 5 to 7 were placed in the mouth, and the oral epidermis was evenly stimulated for 20 seconds, and then spit out. The mouth was washed with water at every evaluation time when the analysis for one sample was completed. After 10 minutes, the next sample was evaluated, and the sensory elements were displayed as 5-point box scale. The sensory evaluation personnel consisted of 15 panelists (male and female with 20 to 40s ages) who were professionally trained in the evaluation of taste and flavor, and marked as 5-point scale. Evaluation criteria of sensory elements are as follows, and the results are shown in Table 23 below.

[Evaluation Criteria]

Sweetness degree (very low 0-very high 5)

Sourness degree (very low 0-very high 5)

Sweetness linger (very low 0-very high 5)

Freshness (very low 0-very high 5)

Overall satisfaction (very bad 0-very good 5)

TABLE 23

| Test | Sweetness degree | Sourness degree | Sweetness linger | Freshness | Overall satisfaction |
| --- | --- | --- | --- | --- | --- |
| Comparative Example5 | 3.5 | 3.2 | 2.4 | 2.7 | 3.6 |
| Comparative Example 6 | 3.5 | 3.2 | 2.5 | 2.6 | 3.6 |
| Example14 | 3.6 | 3.2 | 2.1 | 2.9 | 3.8 |
| Example15 | 3.3 | 3.4 | 1.7 | 3.5 | 3.4 |
| Example16 | 3.5 | 3.3 | 1.8 | 3.4 | 3.6 |
| Example17 | 3.6 | 3.2 | 2.3 | 3.3 | 3.6 |
| Example18 | 3.5 | 3.3 | 2.5 | 3 | 3.4 |
| Comparative Example7 | 3.3 | 3.3 | 2.7 | 2.9 | 3.2 |

The high intensity sweeteners (aspartame, acesulfame K, sucralose, steviol glycosides, enzymatically treated stevia, etc.) can give as tens to hundreds times of the sweetness of sugar at a small amount, but has disadvantage of the long-lasting of astringency, bitterness, and sweetness in the aftertaste. To improve such bad sweetness qualities, many efforts have been made, but it is very difficult to solve it. Acesulfame potassium and sucralose used as high intensity sweeteners in this experiment, have a disadvantage of sweetness attraction in aftertaste, which could be improved partially by using allulose.

Erythritol was expected to give freshness in aftertaste as sugar alcohol, but was a problem of leaving a heavy aftertaste. Because allulose had a refreshing taste property, it was confirmed that allulose has an advantage of improving the refreshing feeling in aftertaste, when it was properly mixed with erythritol.

The invention claimed is:

1. A low-calorie water beverage composition, comprising a sweetener containing allulose, an acidity regulator, probiotic microorganisms, and water, wherein the water beverage composition has a water content of 90% by weight or more and ΔE*ab value of 0.05 to 5.0 so as to prevent browning, wherein, based on 100% by weight of solid content of the water beverage composition, the solid content of allulose is 0.05 to 3% by weight, the content of acidity regulator is 0.05 to 1.0% by weight, and the solid content of probiotic microorganism is 0.0001 to 0.5% by weight, and wherein the acidity regulator is an organic acid or a salt thereof.

2. The beverage composition of claim 1, wherein the beverage composition has a calorie of less than 30 Kcal per 100 g of beverage composition.

3. The beverage composition of claim 1, wherein the beverage composition has an acidity of 0.05 to 1.0 and a pH of 2.5 to 4.0.

4. The beverage composition according to claim 1, further comprising at least one flavoring agent selected from the group consisting of yogurt flavor, apple flavor, banana flavor, pear flavor, apricot flavor, peach flavor, orange flavor, lemon flavor, grapefruit flavor, and lime flavor.

5. The beverage composition of claim 1, wherein the sweetener further comprises at least one selected from the group consisting of sucralose, aspartame, acesulfame salt, steviol glycoside, rebaudioside, sodium cyclamate, dulcine, thaumatin, tomatine, neotame, and monelin.

6. The beverage composition of claim 1, wherein the allulose is provided as allulose syrup having a pH range of 4 to 6.

7. A low-calorie gel-phase beverage composition, comprising a gelling agent containing gellan gum, a sweetener containing allulose and erythritol, and an organic acid or a salt thereof, wherein the allulose and the erythritol are gel stabilizers for the gel-phase beverage composition, wherein the solid content of erythritol is 30 to 350 parts by weight based on 100 parts by weight of the solid content of allulose, wherein the gelling agent is contained at 0.01% to 2.0% by weight based on 100% by weight of the total gel-phase beverage composition, wherein the gel-phase beverage composition has a water content of 50% by weight or more and a water release rate of 6.0% or lower as measured after storage at 35° C. for 10 days, wherein the gel-phase beverage composition has a gel phase in a temperature range of 1° C. to 35° C., and wherein the gel-phase is characterized as a semi-solid form of colloidal solution which is solidified with a dispersion medium.

8. The beverage composition of claim 7, wherein the gel-phase beverage has at least one property selected from the group consisting of the following properties:

(1) a hardness of 10 to 500 g, and (2) an acidity of 0.05 to 1.0.

9. The beverage composition according to claim 7, wherein the gelling agent further comprises at least one selected from the group consisting of xanthan gum and locust bean gum.

10. The beverage composition of claim 7, wherein the gelling agent comprises 0 to 200 parts by weight of at least one selected from the group consisting of xanthan gum and locust bean gum, based on 100 parts by weight of gellan gum.

11. The beverage composition according to claim 7, wherein the gellan gum is contained in an amount of 0.005 to 1.5% by weight based on 100% by weight of the total gel-phase beverage composition.

12. The beverage composition of claim 7, wherein the gel-phase beverage further comprises a gelling accelerator.

13. The beverage composition according to claim 7, further comprising at least one sweetener selected from the group consisting of sucralose, aspartame, acesulfame salt, steviol glycosides, rebaudioside, sodium cyclamate, dulcine, taumatin, tomatine, neotame, and monelin.

14. The beverage composition according to claim 7, wherein the beverage does not contain at least one selected from the group consisting of carbon dioxide and emulsifier.

* * * * *